United States Patent
Kotz et al.

(10) Patent No.: US 9,751,437 B2
(45) Date of Patent: Sep. 5, 2017

(54) DRIVE FOR MOTOR-VEHICLE ACCESSORY

(71) Applicant: GRAMMER AG, Amberg (DE)

(72) Inventors: Maximilian Kotz, Rieden (DE); Michael Roemer, Altdorf (DE); Joerg Damaske, Freiberg (DE); Ulrich Hohl, Heilbronn (DE); Heiner Fees, Bietigheim-Bissingen (DE)

(73) Assignee: GRAMMER AG, Amberg (DE)

( * ) Notice: Subject to any disclaimer, the term of this patent is extended or adjusted under 35 U.S.C. 154(b) by 51 days.

(21) Appl. No.: 15/003,090

(22) Filed: Jan. 21, 2016

(65) Prior Publication Data

US 2016/0218658 A1    Jul. 28, 2016

(30) Foreign Application Priority Data

Jan. 28, 2015  (DE) .................. 10 2015 000 937

(51) Int. Cl.
*B60N 2/48*  (2006.01)
*B63B 29/04*  (2006.01)

(52) U.S. Cl.
CPC .......... *B60N 2/4805* (2013.01); *B60N 2/4808* (2013.01); *B60N 2/4829* (2013.01); *B63B 2029/043* (2013.01)

(58) Field of Classification Search
None
See application file for complete search history.

(56) References Cited

U.S. PATENT DOCUMENTS

| | | | | |
|---|---|---|---|---|
| 3,671,727 A | * | 6/1972 | Rhoades | G05B 19/4163 318/561 |
| 4,066,946 A | * | 1/1978 | Jones | G05B 11/30 318/603 |
| 4,115,726 A | * | 9/1978 | Patterson | G05B 19/40 318/696 |
| 4,163,928 A | * | 8/1979 | Patterson | G05B 19/40 318/573 |
| 4,453,118 A | * | 6/1984 | Phillips | H02P 1/42 318/779 |
| 6,654,321 B2 | * | 11/2003 | Okada | G11B 7/08529 369/44.14 |
| 7,397,237 B2 | | 7/2008 | Hochhausen | |
| 2002/0145512 A1 | * | 10/2002 | Sleichter, III | G08B 21/06 340/407.1 |
| 2006/0092508 A1 | * | 5/2006 | Baun | G02B 23/00 359/429 |

* cited by examiner

*Primary Examiner* — David E Allred
(74) *Attorney, Agent, or Firm* — Andrew Wilford

(57) ABSTRACT

A drive for a motor-vehicle accessory has a drive motor, a controller that regulates the drive motor, and a sensor associated with the drive motor and that measures the motor speed of the drive motor and transmits to the controller a signal having a pulse rate corresponding to the motor speed. A pulse-rate modifier between the sensor of the drive motor and the controller serves to modify the pulse rate received from the drive motor in such a way that this rate is within a range of the pulse rate processable by the controller and to transmit a modified value of the pulse rate to the controller.

6 Claims, 1 Drawing Sheet

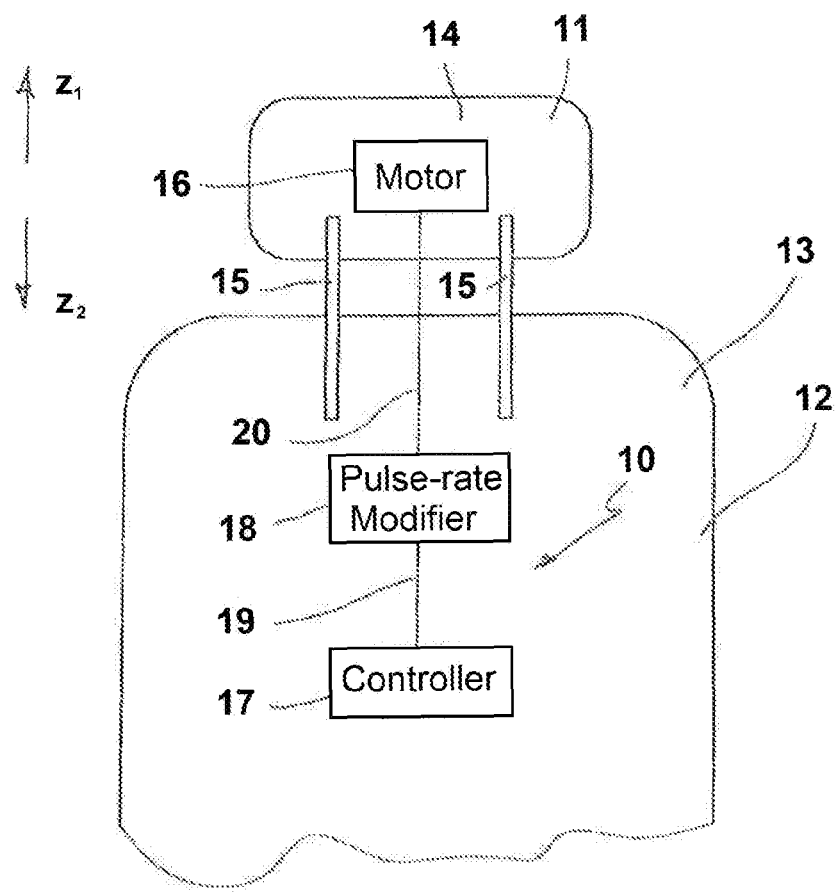

DRIVE FOR MOTOR-VEHICLE ACCESSORY

FIELD OF THE INVENTION

The invention relates to a drive for a motor-vehicle accessory. The vehicle is for example a land vehicle, aircraft or water craft.

BACKGROUND OF THE INVENTION

Such a drive is known from public prior use. Components, such as for example vertically adjustable head restraints of vehicle seats, are equipped with an electric motor that moves the head part of the head restraint for example up or down relative to a seat back. The drive motor is regulated by a controller, for example the seat controller, according to the required displacement path and the required displacement direction.

In this case the seat controller uses a signal of the drive motor that is provided to it with a pulse rate corresponding to the speed of the drive motor. For this purpose the drive motor has a sensor that records the motor speed and converts it into a pulse rate corresponding to the motor speed. This may for example be a Hall effect sensor.

The design of the component requires that the drive motor be small and/or of low weight and/or have a low noise level and/or low noise levels. The noise level of the drive motor is influenced for example by the load acting on the drive motor. The load depends for example on the displacement direction. For example, different loads act on the drive motor as a function of whether the component is displaced upward against gravity or downward in the direction of gravity. If for example a head restraint is displaced against gravity, the load on the drive motor is greater. This generally leads to a different noise level than in the case of a displacement movement of the head restraint downward in the direction of gravity.

Also, higher loads caused by a greater coefficient of friction in the guides of the component or by lower temperatures lead to a higher noise level of the drive motor. If the conditions change over the displacement range, fluctuations of the noise level can occur during operation of the drive motor.

In this case, with regard to the running noise, load fluctuations have a greater effect at high operating speeds than at low operating speeds.

In order to meet the requirements for low weight and small overall size of the component, small drive motors are used. However, these must be operated at high motor speeds. However, load fluctuations then lead to greater noise fluctuations in comparison with drive motors with a low operating speed.

The necessary motor power depends upon the maximum load possible in the system. This motor power results from the actual coefficients of friction of the guides, the effect of the mass of the head restraint and the effect of temperature changes.

In the case of small drive motors this power is generally generated with high motor speeds, so that in the event of variably occurring loads the operating speed is sometimes in a range at which the pulse rate of commercially available controllers transmitted by a sensor can no longer be processed and can lead to malfunction of the controller or of the drive system.

OBJECT OF THE INVENTION

The object of the invention is to change the signals supplied to the controller by a sensor on a high-speed drive motor of a drive for a motor-vehicle accessory so that the pulse rate of the signals for all load ranges is in a range that can be processed by commercially available controllers.

SUMMARY OF THE INVENTION

The drive is provided for the displacement of a component for a motor-vehicle accessory relative to a support. The drive has a drive motor and a controller and also a displacement mechanism that converts the motion of the engine into motion of the component. The drive motor is regulated with regard to its motor speed and direction of rotation by the controller. A sensor connected to the drive motor measures the motor speed of the drive motor and transmits signal with a pulse rate corresponding to the motor speed to the controller. The transmission of the control data from the controller to the drive motor and the transmission of the pulse rate from the sensor of the drive motor to the controller takes place by cables or wirelessly by the usual wireless connections such as wireless LAN, Bluetooth, etc.

According to the invention a pulse-rate modifier is connected between the sensor of the drive motor and the controller. In other words, the sensor transmits the pulse rate to the pulse-rate modifier that in turn modifies the pulse rate transmitted by the drive motor in such a way that it lies within a pulse rate value range processable by the controller. The pulse-rate modifier may be an electronic component or a second controller with software. The pulse-rate modifier transmits the modified value of the pulse rate to the controller.

In this way drive motors can be regulated by commercially available controllers, and a pulse rate corresponding to the maximum speed of the drive motor can be higher than or lower than the pulse rate processable by the controller.

According to one embodiment, the pulse-rate modifier is an electronic component, in particular a commercially available electronic component. According to one embodiment the pulse-rate modifier is a frequency divider. Frequency dividers are commercially available electronic components that are obtainable cost-effectively on the market. The frequency divider can in a simple manner carry out a reduction, for example a halving, of the pulse rate corresponding to the motor speed. However, according to an alternative the electronic component can also apply a different function to the pulse rate. In this way the pulse-rate modifier can effect a proportionate reduction or an increase of the pulse rate.

According to an alternative embodiment, the pulse-rate modifier can also be formed by a controller provided with software that carries out a controllable change of the pulse rate and transmits it to the controller. The pulse rate transmitted by the sensor of the drive motor communicated can then be changed according to a function input via the software.

The sensor of the drive motor may be formed for example by a Hall effect sensor.

The invention is also a displacement device comprising a component for a motor-vehicle accessory and a support, where the component can be moved relative to the support by the drive according to the invention.

Moreover, the invention is a head restraint that has a head part supported by at least one support rod on the seat back of the vehicle seat. The head part is designed to be displaceable relative to the seat back. The head part and the seat back form the displacement device according to the invention, and the head part is a component for a motor-vehicle accessory and the seat back is a support. The head part is movable relative to the seat back by the drive according to the invention. The support rods are associated with the head part. For example, the head part is displaceable relative to support rods fixed to the seat back. According to an alternative the support rods are fixed on the head part and the support rods are movable relative to the seat back.

BRIEF DESCRIPTION OF THE DRAWING

Further advantages are apparent with reference to an illustrated embodiment illustrated in the drawing whose sole FIGURE is a schematic representation of the invention.

SPECIFIC DESCRIPTION OF THE INVENTION

A drive as a whole is shown in the drawing at 10.

In the present illustrated embodiment the drive 10 is provided for controlling a head restraint 11 displaceable in the directions $z_1$ and $z_2$ and mounted on the seat back 12 of a vehicle seat 13. The head restraint 11 has a head part 14 and support rods 15. The head part 14 is secured to the support rods 15. The support rods 15 in turn are mounted in bearings fixed to the seat back. The head part 14 is mounted so as to movable in the directions $z_1$ and $z_2$ relative to the seat back 12 by an electric motor 16. The head part 14 is mounted for example so as to be movable relative to the support rods 15 and the support rods 15 are for example mounted so as to be fixed in the seat back 12.

According to an alternative embodiment, the drive motor can move the support rods 15 relative to the bearings fixed to the seat back, and the head part 14 is fixed on the support rods 15.

The drive motor 16 is regulated by a seat controller 17. The drive motor 16 and seat controller 17 are connected by data lines shown at 19 and 20 such that data can be transferred. This can take place for example by cable, wireless communication, WLan etc. The seat controller 17 can control the drive motor 16 through the data lines 19 and 20. For control of the drive motor 16 the seat controller 17 requires the current value of the speed $n_{Motor}$ of the drive motor 16. The drive motor has a sensor that records the motor speed $n_{Motor}$ and converts it into a signal having a pulse rate $P_{Motor}$ corresponding to the motor speed. This may for example be a Hall effect sensor.

The seat controller 17 that only processes pulses with a half-cycle duration greater than 3.6 ms can record a maximum pulse rate $P_S$ of 8333/min. If the motor emits 1 pulse/revolution to the seat controller, in the prior art this means that a maximum engine speed $n_{MotorMax}$=8333/min could be processed. If the seat controller receives higher pulse rates $P_{Motor}$>8333/min, a system failure would occur.

In order to meet the requirements as to overall size, weight and displacement noise, a smaller drive motor 16 must be used whose maximum speed $n_{MotorMax}$ is for example greater than 8333/min, for example 12000/min. According to the invention it is possible for the pulse rate supplied by the sensor of the drive motor processable by the seat controller 17, because a pulse-rate modifier 18 is provided between the drive motor 16 and the seat controller 17. The pulse rate $P_{Motor}$ corresponding to the motor speed $n_{Motor}$ is transmitted by the sensor of the drive motor 16 via the line 20 to the pulse-rate modifier 18.

If the pulse-rate modifier 18 operates for example with a ratio of 2:1, the pulse rate $P_{Motor}$ is divided for example in such a way that only every second pulse is transmitted to the seat controller 17, and thus the pulse rate $P_{Motor}$ of the sensor is halved. The reduced value of the pulse rate $P_{Reduz}$ must be below the maximum pulse rate of the seat controller $P_S$ to be processed. With a half-cycle duration of the seat controller greater than 3.6 ms, $P_S$=8333/min. The reduced value of the pulse rate $P_{Reduz}$ is transmitted via the line 19 to the seat controller 17.

In this illustrated embodiment the maximum pulse rate of the motor $P_{MotorMax}$=12000/min. With a division ratio of the pulse-rate modifier of 2:1, the maximum pulse rate arriving at the seat controller $P_{Reduz}$=6000/min. In this way, due to a pulse count $P_{Motor}$>$P_S$ transmitted to the seat controller 17, system failure is prevented. At the same time, a reduced pulse rate $P_{Reduz}$ proportional to the motor speed $n_{Motor}$ is supplied to the seat controller 17.

The invention claimed is:

1. A drive for a motor-vehicle accessory comprising:
   a drive motor;
   a controller that regulates the drive motor;
   a sensor associated with the drive motor and that measures the motor speed of the drive motor and transmits to the controller a signal having a pulse rate corresponding to the motor speed; and
   a pulse-rate modifier between the sensor of the drive motor and the controller that
   modifies the pulse rate received from the drive motor in such a way that this rate is within a range of the pulse rate processable by the controller, and
   transmits a modified value of the pulse rate to the controller.

2. The drive according to claim 1, wherein the pulse-rate modifier is an electronic component.

3. The drive according to claim 1, wherein the pulse-rate modifier is a frequency divider.

4. The drive according to claim 1, wherein the pulse-rate modifier is an electronic controller.

5. A displacement device comprising a component for a motor-vehicle accessory and a support, wherein the component can be moved relative to the support by a drive according to claim 1.

6. A head restraint with a head part mounted by at least one support rod in at least one bearing on a seat back of a vehicle seat, the head part being displaceable relative to the seat back, wherein
   the head part and the seat back form a displacement device for moving the head part relative to the seat back,
   the head part is a component and the seat back is a support, and
   the head part can be moved relative to the seat back by a drive according to claim 1.

* * * * *